United States Patent [19]
Cho

[11] Patent Number: 5,474,326
[45] Date of Patent: Dec. 12, 1995

[54] INFLATABLE AIR-BELT FOR VEHICLE SAFETY SYSTEM

[76] Inventor: Sung H. Cho, Jin Heung Apt. 121-1112, 97-3 AnYang 1st Dong, AnYang City KyungKi-Province, Rep. of Korea

[21] Appl. No.: 299,007

[22] Filed: Aug. 31, 1994

[30] Foreign Application Priority Data

Jan. 28, 1994 [KR] Rep. of Korea ............... 1994-1529
Jul. 23, 1994 [KR] Rep. of Korea ............. 1994-17886

[51] Int. Cl.⁶ ............................................. B60R 21/18
[52] U.S. Cl. ...................................... 280/733; 297/471
[58] Field of Search ............................. 280/733, 801.1; 297/471

[56] References Cited

U.S. PATENT DOCUMENTS

| | | | |
|---|---|---|---|
| 3,897,081 | 7/1975 | Lewis | 280/733 |
| 3,970,329 | 7/1976 | Lewis | 280/733 |
| 4,148,503 | 4/1979 | Shiratori | 280/728 B |
| 4,348,037 | 9/1982 | Law et al. | 280/733 |
| 5,303,953 | 4/1994 | Kamiyama | 280/733 |

FOREIGN PATENT DOCUMENTS 5-112199  5/1993  Japan ................... 280/733

*Primary Examiner*—Karin L. Tyson
*Attorney, Agent, or Firm*—Keck, Mahin & Cate

[57] ABSTRACT

An inflatable air-belt comprises an air tube and a sheath surrounding the air tube. While the sheath has a flat strip shape when the air-belt is used as an usual flat belt, the air tube is inflated when a predetermined impact is applied to a sensor for the air-belt. The air tube may be folded toward its center along its both sides. The sheath may be formed with cut perforated lines along its both sides. The sheath may comprise two flat strips which are attached to each other by means of hook-loop fastener attached to longitudinal edges of the flat strips. The air-belt is provided at its middle portion with a locking buckle assembly for securing the middle portion of the air-belt to the vehicle body. The locking buckle assembly has a locking buckle fixed to the vehicle body and a buckle tongue connected to the air-belt. The buckle tongue is formed with a breakable portion defined by a perforated line extended from both ends of hole thereof such that the perforated line extended from both ends of hole thereof such that the breakable portion is removed to form an enlarged hole by inflation of the air-belt at the time of collision.

5 Claims, 6 Drawing Sheets

F I G. 13
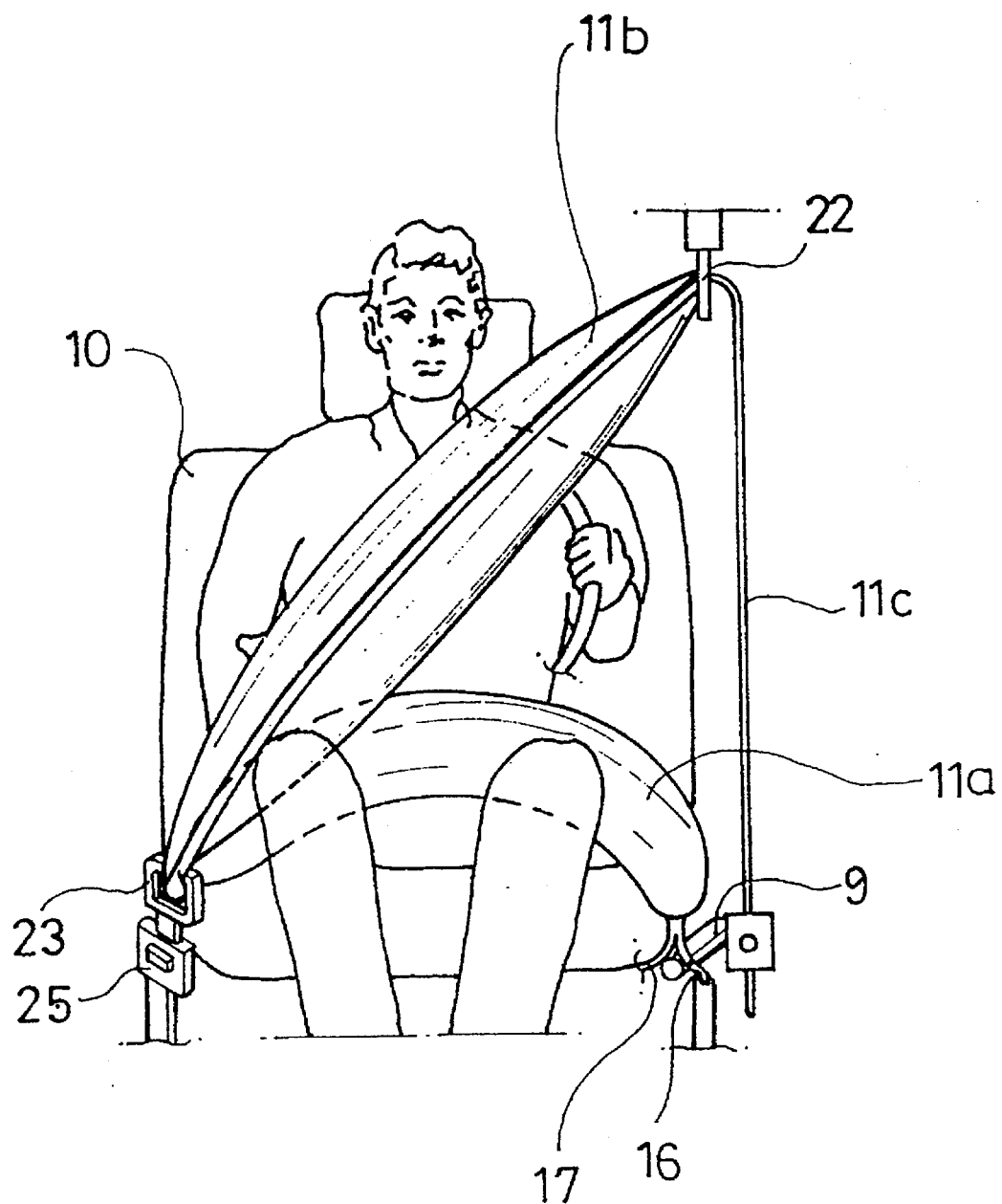

INFLATABLE AIR-BELT FOR VEHICLE SAFETY SYSTEM

BACKGROUND OF THE INVENTION

1. Field of the Invention

The present invention relates to a safety device for vehicle, and more particularly to an inflatable air-belt for a vehicle safety system.

2. Description of the Prior Art

A conventional safety belt for vehicle usually consists of a simple fibrous strip and is designed to limit the forward motion of the upper half of the occupant. The above-mentioned safety belt functions to prevent fatal accident by keeping the occupant from moving forward and striking the vehicle structure during a collision. However, since the safety belt restrains the occupant with its simple narrow fibrous bend as mentioned above, the safety belt may rapidly apply intense pressure to the breast and the abdominal regions of the occupant. Hence, the breast and the abdominal regions of the occupants may be intensely wounded as a result of application of the rapid pressure.

on the other hand, safety belt of air bag type (so called "air-belt") which is adapted to be inflated in a very short time by introducing gas from an air tank thereinto when a shock power by collision of the vehicle is higher than a predetermined value are disclosed in U.S. Pat. Nos. 3,866,940 and 3,865,398.

However, since the safety belt of air bag type has inflatable sections made of soft flexible PVC material, etc., which is normally exposed, the inflatable sections of the belt is liable to be damaged. On the other hand, if the inflatable sections are made of hard material in order to overcome the abovementioned problem occurring in the soft PVC air-belt, occupant concern about damage to his chest and abdomen area, due to belt tightening, decreases but since the air-belt does not have much capability of inflating, due to the hard material used, the shock absorption is not enough to prevent injuries caused by an accident. Accordingly, it is not desirable that the material of the air-belt made of hard material. However, the soft material of the air-belt is substantially expensive. In case of the former air-belt, since the air-belt is constructed of two separate sections, it is complicated in structure. Also, since the two section of the air-belt have fixed lengths, it is difficult to adjust length of the air-belt to a size of the occupant.

In case of the latter air-belt, although the air-belt is designed to substantially solve the problem of the former by providing an L-shaped traveler having a foot sliding along a rod, it is required to have additional complicated components such as the rod, an end mount and the L-shaped traveler and thus the components occupy considerable space to be mounted in the vehicle. Hence, the air-belt is not desirable from an appearance point of view because of the additional components. And if a middle buckle in the latter is secured to a vehicle body, the breast and the abdominal region can be protected against collision by means of a single air-belt. However, the middle buckle has a serious problem in that since a hole of an elongated ring of the middle buckle is relatively small, inflating gas pressure which has inflated the lower part of the air -belt below the middle buckle can not immediately inflate the upper part of the air-belt due to a portion of the belt fastened by the middle buckle, thereby causing the complete inflation to be retarded. In order to solve the problem in that the air-belt is fastened by the middle buckle, it is desirable that the hole of the elongated ring is four times or larger than the sectional area of the air-belt. But it is not suitable in appearance and also another article may be caught in the middle buckle.

Furthermore, since the air-belts of the both types are drooped when not in use, it is not comfortable to wear them and their appearance is not attractive.

SUMMARY OF THE INVENTION

The present invention has been made in view of the above-described problems occurring in the prior art and an object of the invention is to provide an inflatable air-belt which incorporates an inflatable air tube made of material used in an common air bag and adapted to be inflated by pressurized gas at the time of collision to protect the occupant against a shock.

In accordance with the present invention, the abovementioned object can be accomplished by providing an inflatable air-belt for a vehicle safety system comprising: 1) an air tube made of material used in an common air bag which is fixed to a vehicle body and connected to a reel device at one end, and fixed to the vehicle body and in gas communication with an air tank at the other end which is adapted to be inflated by the pressurized gas in the air tank to protect the occupant against shock at the time of collision, 2) and a locking buckle assembly for securing the portion between both ends of the air tube to the vehicle body, and having a locking buckle fixed to the vehicle body, 3) a buckle tongue to be selectively coupled to the locking buckle, and 4) having an elongated hole to be passed through by the air tube, characterized in that the air tube is surrounded with a fibrous sheath; and the buckle tongue is formed with a perforated line extended from both ends of the elongated hole such that a breakable portion defined by the perforated line is removed to form an enlarged hole by inflation of the air tube at the time of collision.

The air tube may be folded toward its center along its both sides, and the sheath is formed with perforated lines along its both sides.

The air tube may be folded toward its center along its both sides, and the sheath contains two strips which are attachable to each other by means of hook-loop fastener attached to longitudinal edges of the strips.

The locking buckle may be provided with a switch connected to a circuit for controlling activation of the air tank such that the air tank is activated only when the buckle tongue is coupled to the locking buckle.

BRIEF DESCRIPTION OF THE DRAWINGS

These and other objects, features and advantages of the invention will become more apparent upon a reading of the following detailed specification and drawings, in which:

FIG. 13 is a schematic view showing the air-belt of the invention in which the air-belt is inflated at the time of collision.

DETAILED DESCRIPTION OF THE PREFERRED EMBODIMENTS

Embodiments according to an inflatable air-belt of the present invention will be described with reference to the accompanying drawings hereinafter.

Figure 1:
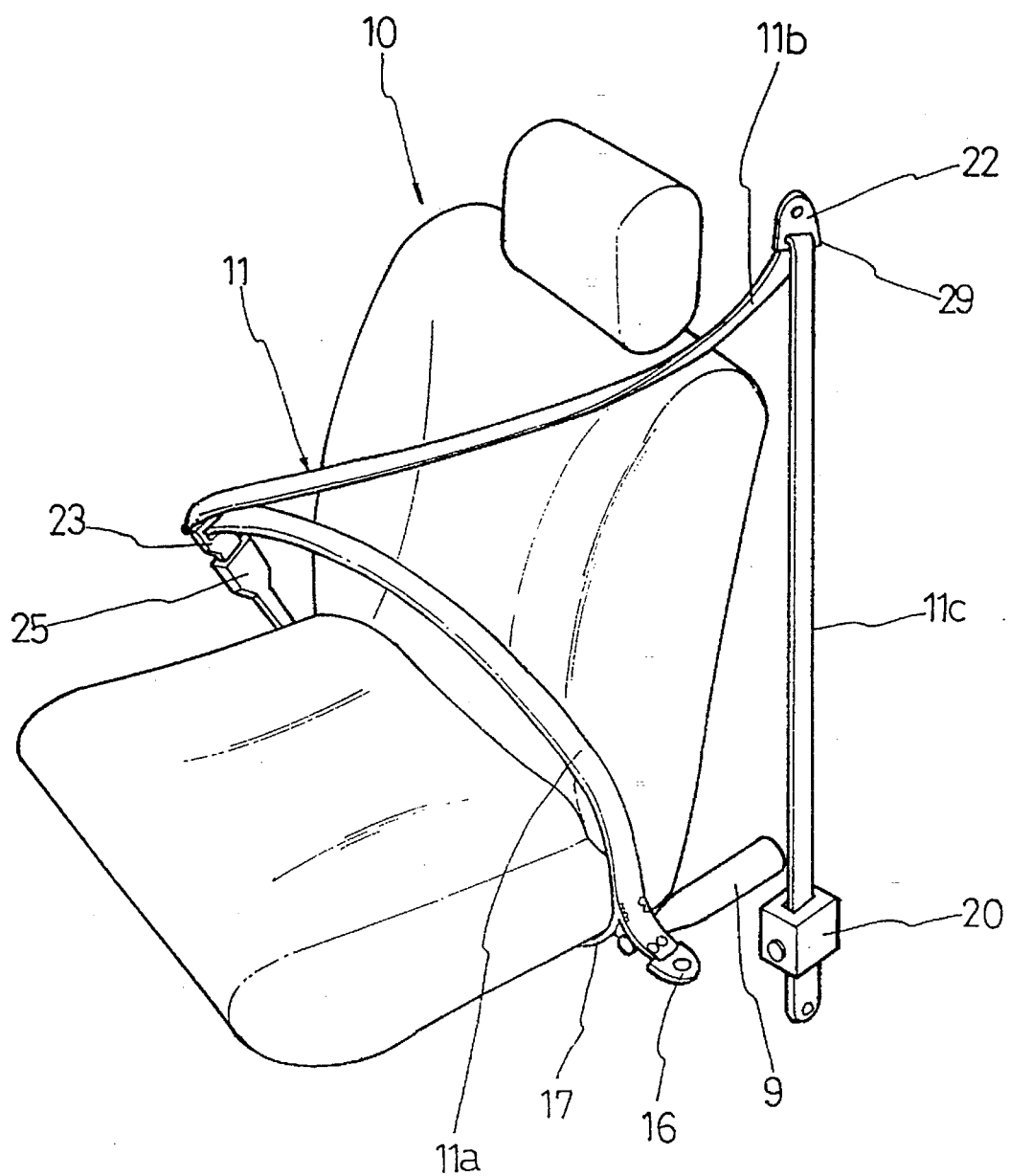
FIG. 1 is a perspective view showing an inflatable air-belt and an air tank according to the invention which are mounted on a seat of a vehicle.

FIG. 1 shows an inflatable air-belt according to an embodiment of the invention which is mounted on a seat of a vehicle. In the drawing, reference numeral 9 denotes an air tank, numeral 10 denotes a seat, and numeral 11 denotes the inflatable air-belt of the invention.

Figure 4:
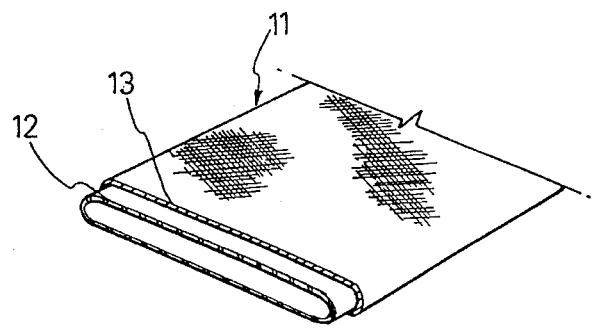
FIG. 4 is a perspective view showing a section of the air-belt according to an embodiment of the invention.
Figure 5:
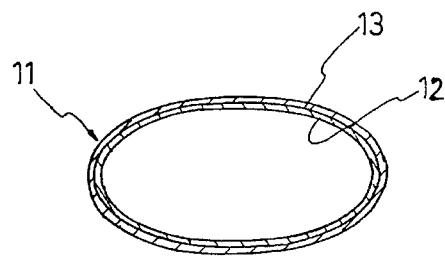
FIG. 5 is a sectional view of FIG. 4 when the air-belt is inflated.

FIGS. 4 and 5 show an inflatable air-belt according to an embodiment of the invention. As shown in the drawings, the inflatable air-belt of the invention which may be supported at three points comprises an inner air tube 12 and an outer fibrous sheath 13 surrounding the air tube 12. The inner air tube 12 and the outer sheath 13 are normally deflated such that the air-tube 11 has a flat strip shape. When the vehicle incorporating the air-belt 11 collides with another object, the inner air tube 12 and the outer sheath 13 is inflated into a round or elliptic section by the pressurized gas.

Figure 6:
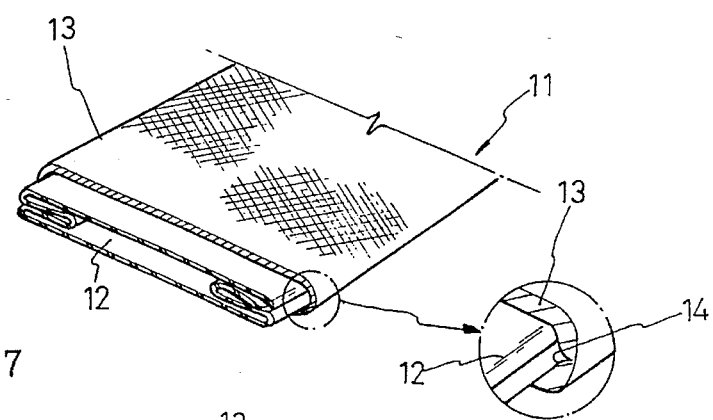
FIG. 6 is a perspective view showing a section of the air-belt according to another embodiment of the invention.
Figure 7:
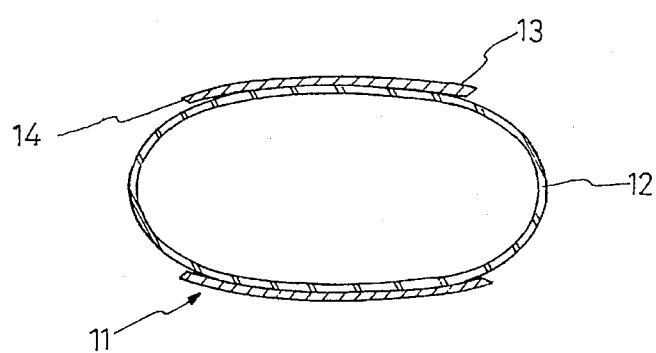
FIG. 7 is a sectional view of FIG. 6 but the air-belt is inflated.

FIGS. 6 and 7 show an inflatable air-belt according to another embodiment of the invention. The inflatable air-belt 11 also comprises an inner air tube 12 and an outer sheath 13 as in the first embodiment. In the air-belt 11, the inner air tube 12 is normally deflated in such a manner that the air tube 12 is folded toward its center along its both sides, and the outer sheath 13 is formed with cut lines 14 along both sides corresponding to the both sides of the inner air tube 12 so that the outer sheath 13 is easily divided into two parts by inflation of the inner air tube 12 as shown in FIG. 7. Accordingly, since the air-belt 11, according to the second embodiment, can be inflated into a volume larger than that of the first embodiment, the air-belt 11 can absorb higher shock.

Figure 8:
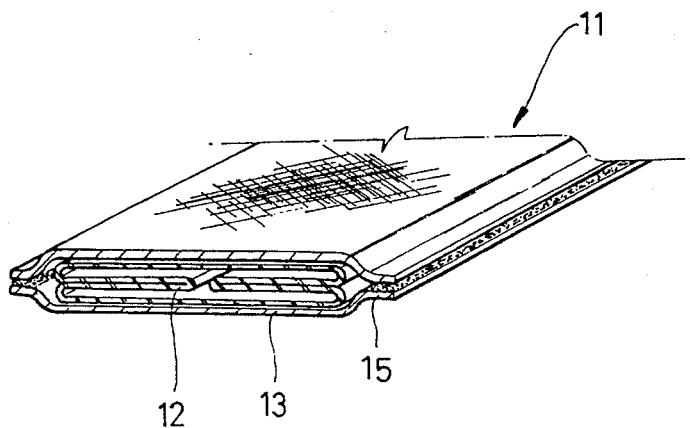
FIG. 8 is a perspective view showing a section of the air-belt according to still another embodiment of the invention.

FIG. 8 shows an inflatable air-belt 11, according to still another embodiment of the invention. The air-belt 11 comprises an inner air tube 12 and an outer sheath 13 surrounding the inner air tube 12. The inner air tube 12 is folded toward its center along both sides as in the second embodiments. However, the outer sheath 13 comprises two bend type sheets of strips different from the first and second embodiments. Each of the sheets is provided, at its both longitudinal edges, with hook-loop fasteners 15, so that the two sheets is attached to each other by means of the hook-loop fastener. Accordingly, when the inner air tube 12 is inflated due to a collision, the two sheets of the outer sheath 13 are separated from each other in result of detachment of the hook-loop fastener to allow the inner air tube 12 to be further inflated. After the inflation of the air-belt 11, the inner air tube 12 can be folded again and the outer sheets can be attached to each other via the hook-loop fastener in order to reuse the air-belt 11.

Figure 2:
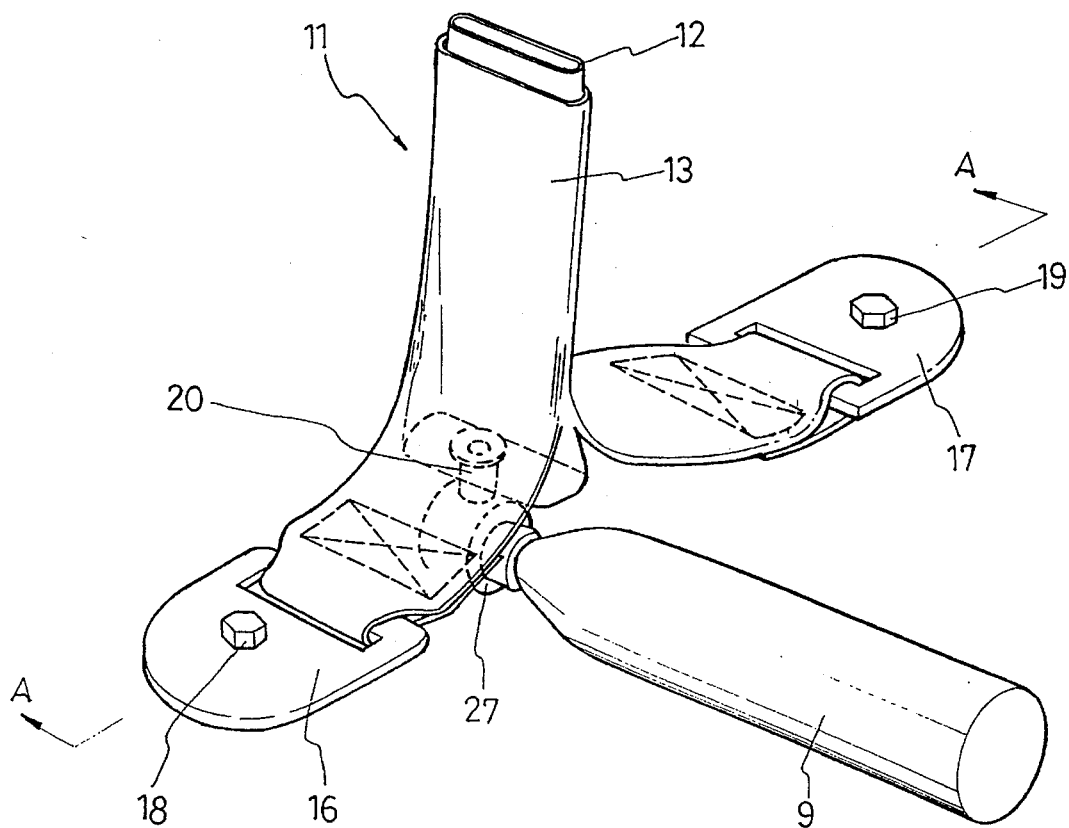
FIG. 2 is an enlarged perspective view showing the air-belt and the air tank which are secured to a vehicle body.
Figure 3:
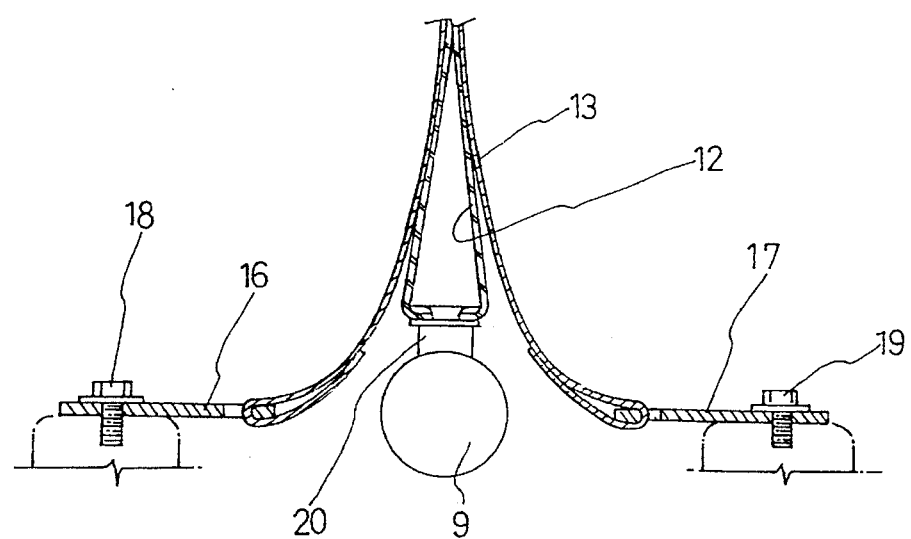
FIG. 3 is a sectional view taken along line A—A of FIG. 2.

FIGS. 2 and 3 illustrate such manners that the sheath 13 of the air-belt 11 is fixed to a vehicle body and the air tube 12 is connected to an air tank 9. As shown in the drawings, an end of the sheath 13 is, of course, divided into two branch straps. The two branch straps of the sheath 13 is connected to connecting pieces 16 and 17, respectively. The connecting pieces 16 and 17 are fixed to the vehicle body by means of bolts 18 and 19. The air tank 9 is disposed in a longitudinal direction of the vehicle body. An air nozzle 20 of the air tank 9 is in communication with a lower end of the air tube 12 surrounded by the sheath 13.

Accordingly, when the vehicle collides with an obstacle or obstacles at higher intensity than a predetermined impact, a puncturing needle in an air supplying system is moved to pierce the air tank 9 so that high pressure filled in the air tank 9 is immediately supplied into the air tube 12, thereby causing the air tube 12 to be inflated.

The air supplying system may be a known system such as impact type (mechanical type), electrical type or electronic type. A sensor may also be a sensor for an air bag (attached to the vehicle body) and may be used with an air bag (which is activated simultaneous to air bag's activation).

The other end of the safety air-belt incorporating the air tube is connected to a reel device 21 such that the air-belt is wounded around the reel device. Therefore, the occupant can appropriately adjust a length of the air-belt according to his body size.

When the air-belt is a two point support type, that is, the both ends of air-belt supported at two points of the vehicle body, the other end of the air-belt 11 is directly connected to the reel device. However, when the air-belt 11 is a three point support type, that is, the air-belt 11 is supported at its both ends and a middle portion, the other end of the air-belt 11 is preferably passed through an upper slip guide 22 fixed to a predetermined position above seat 10.

Figure 9:
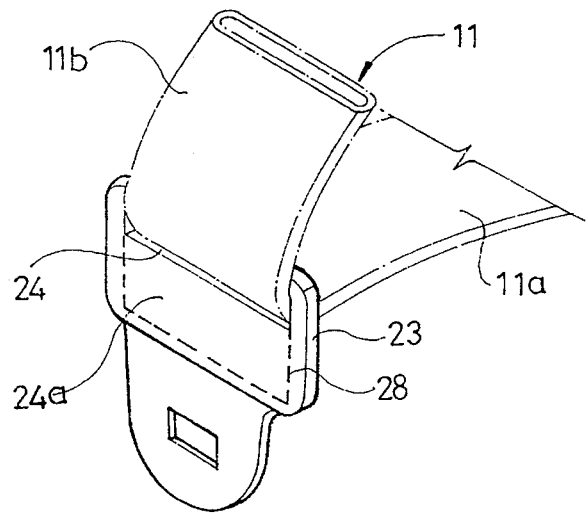
FIG. 9 is a perspective view showing a buckle tongue of the invention.
Figure 10:
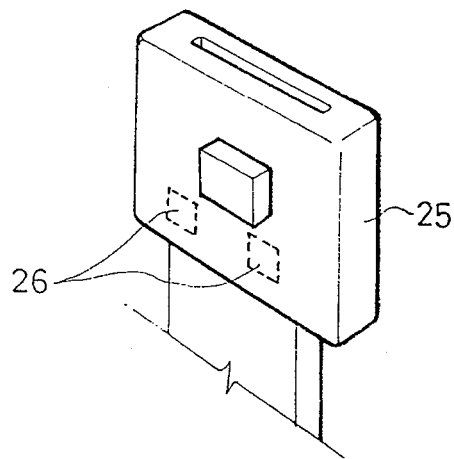
FIG. 10 is a perspective view showing a locking buckle of the invention.

FIG. 9 shows a locking buckle assembly comprising a locking buckle 25 and a buckle tongue 23 to be coupled to the locking buckle 25. The locking buckle 25 is fixed to a side opposite to the connecting pieces 16 and 17 and the buckle tongue 23 is coupled to the locking buckle 25. Since the air-belt 11 is passed through an elongated hole 24 of the buckle tongue 23 and a hole 29 of the upper slip guide 22 (see FIG. 1) and connected to the reel device, the air-belt 11 is divided into an abdominal section 11a and a breast section 11b by adjusting the buckle tongue position and inserting the buckle tongue 23 into the locking buckle 25.

In this case, since the locking buckle 25 is provided with a contact switch 26 and the contact switch 26 is electrically connected to a circuit for causing the pressurized gas in the air to be introduced into the air tube 12, the air tank activation part 27 is activated to inflate the air tube only when the buckle tongue 23 is inserted into and coupled to the locking buckle 25.

Figure 11:
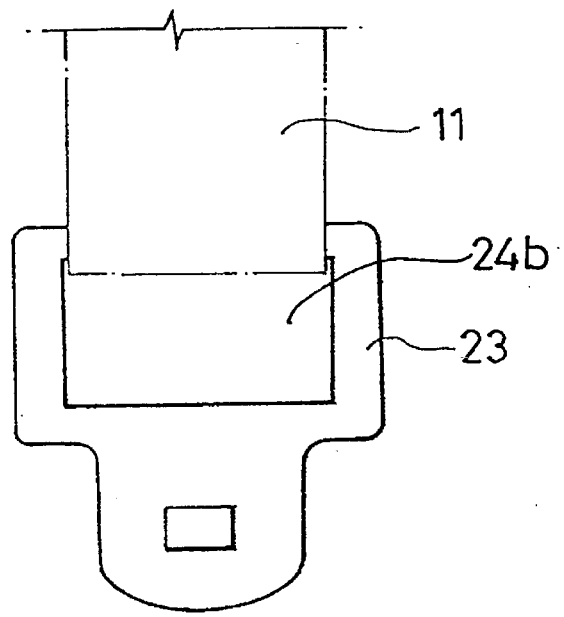
FIG. 11 is a front view showing the buckle tongue in which a breakable portion is removed to form an enlarged hole.

Since the buckle tongue 23 has the elongated hole 24 having a size adapted to allow only the air-belt 11 to be passed therethrough, the pressurized gas passing through the air-belt 11 is not sufficiently transmitted to the breast section 11b immediately due to the fastening action of the elongated hole 24. For overcoming this problem, the buckle tongue 23 is formed with a perforated line extended from both ends of the elongated hole 24. Hence, the buckle tongue 23 is cut off along the perforated line 28 and a breakable portion 24a is removed by inflation force of the air-belt 11 at the time of collision, so that the elongated hole 24 of the buckle tongue 23 is enlarged into an enlarged hole 24b, as shown in FIG. 11. As result of enlargement of the elongated hole 24, the pressurized gas can be transmitted to the breast section 11b immediately (within 0.5 sec).

On the contrary, the hole 29 of the upper slip guide 22 is sized to allow only the air-belt 11 to be passed therethrough such that the pressurized gas is hardly transmitted to a vertical section 11c of the air-belt 11 immediately. After inflation of the air-tube 11, the gas filled in the breast section 11b is gradually introduced into the vertical section 11c to improve comfort and protect the occupant.

In the air-belt of the invention, the air tube 12 does not need to be provided up to the end of the air-belt to be connected to the reel device. Practically, it is preferable that the air tube 12 is extended to a desired length, that is, to a position between the upper slip guide and the reel device.

Figure 12:
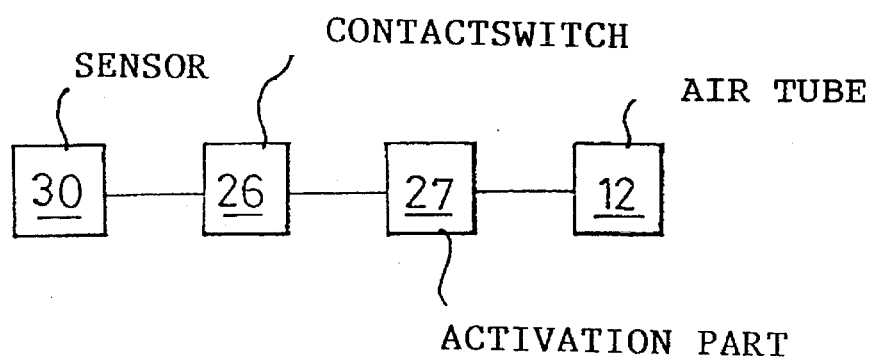
FIG. 12 is a schematic diagram showing a relationship between a sensor and an air tank activation part.

FIG. 12 shows a schematic diagram showing a relationship between the sensor 30 and the air tank activation part 27. As described above and shown in FIG. 12, the air tank activation part 27 is activated only when the contact switch 26 is closed and is not activated when the buckle tongue 23 is not coupled to the locking buckle 25.

As it is apparent from the above description, the air-belt, according to the invention, comprises the air tube and the sheath surrounding the air tube. The air-belt has an usual flat strip shape during normal use, but it is inflated by pressurized gas in the air tank to protected the occupant against shock at the time of collision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An inflatable air-belt for a vehicle safety system comprising an air tube made of common material and communicated with an air tank and adapted to be positioned about an occupant and to be inflated by a pressurized gas in the air tank to protect the occupant against shock at the time of collision, which is fixed to connecting pieces at one end and connected fixed to a reel device at the other end thereof, and passed through an elongated hole of a buckle tongue coupled to a locking buckle for securing a portion between both said ends of said air belt, said air tube is surrounded with a fibrous sheath, and the buckle tongue formed with a perforated line extended from both ends of the elongated hole such that a breakable portion defined by the perforated line is removed to form an enlarged hole by inflation of the air tube at the time of collision.

2. An inflatable air-belt for a vehicle safety system as recited in claim 1, in which the air tube is folded toward its center along its both sides, and the sheath is formed with the cut lines along its both sides such that the sheath is broken into a plurality of part by inflation of the air tube at the time of collision.

3. An inflatable air-belt for a vehicle safety system as recited in claim 1, in which the air tube is folded toward its center along its both sides, and the sheath comprises two strips which are attachable to each other by means of hook-loop fastener attached to longitudinal edges of the strips such that the strips are divided into two separate strips by inflation of the air tube at the time of collision.

4. An inflatable air-belt for a vehicle safety system as recited in claim 1, in which the locking buckle is contains a switch connected to a circuit for controlling actuation of the air tank such that the air tank is actuated only when the buckle tongue is coupled to the locking buckle.

5. An inflatable air-belt for a vehicle safety system as recited in claim 2, in which said sheath is broken into two parts by inflation of the air tube at the time of collision.

* * * * *